(12) United States Patent
Bezryadin (10) Patent No.: US 6,933,971 B2
(45) Date of Patent: Aug. 23, 2005

(54) RECONSTRUCTION OF COLOR COMPONENTS IN DIGITAL IMAGE PROCESSING

(75) Inventor: Sergey N. Bezryadin, San Francisco, CA (US)

(73) Assignee: KWE International, Inc., San Francisco, CA (US)

( * ) Notice: Subject to any disclaimer, the term of this patent is extended or adjusted under 35 U.S.C. 154(b) by 646 days.

(21) Appl. No.: 10/145,666

(22) Filed: May 14, 2002

(65) Prior Publication Data

US 2003/0214594 A1 Nov. 20, 2003

(51) Int. Cl.[7] .............................. H04N 3/14; H04N 9/64; H04N 5/76; G06K 9/00; G06K 9/32
(52) U.S. Cl. .................... 348/280; 348/242; 348/231.6; 382/167; 382/300
(58) Field of Search .......................... 348/223.1, 231.6, 348/234, 242, 270–273, 277–280; 382/162, 167, 300; 358/519, 525

(56) References Cited

U.S. PATENT DOCUMENTS

| | | | |
|---|---|---|---|
| 3,971,065 A | 7/1976 | Bayer ............................ | 358/41 |
| 5,373,322 A | 12/1994 | Laroche et al. .............. | 348/273 |
| 5,382,976 A | 1/1995 | Hibbard ........................ | 348/273 |
| 5,506,619 A * | 4/1996 | Adams et al. ............... | 348/272 |
| 5,805,213 A | 9/1998 | Spaulding et al. ........... | 348/222 |
| 6,181,376 B1 | 1/2001 | Rashkovskiy et al. ...... | 348/273 |
| 6,236,433 B1 | 5/2001 | Acharya et al. ............. | 348/273 |
| 6,320,593 B1 | 11/2001 | Sobel et al. ................. | 345/600 |
| 6,421,084 B1 * | 7/2002 | Chang et al. ................ | 348/273 |
| 6,493,029 B1 * | 12/2002 | Denyer et al. .............. | 348/280 |
| 6,549,233 B1 * | 4/2003 | Martin ......................... | 348/273 |
| 6,570,616 B1 * | 5/2003 | Chen ........................... | 348/272 |
| 6,744,916 B1 * | 6/2004 | Takahashi ................... | 382/162 |
| 6,781,626 B1 * | 8/2004 | Wang .......................... | 348/273 |
| 6,842,191 B1 * | 1/2005 | Smith .......................... | 348/273 |
| 2002/0012054 A1 | 1/2002 | Osmato ....................... | 348/273 |

OTHER PUBLICATIONS

ACE Camera, ACE Camera Photo Magazine, Nikon D1 Digital Camera—In Depth Review By Photograph . . ., http://www.acecam.com/magazine/nikon–d1.html, Feb. 12, 2002, pp. 1–3.

Raw format digital raw diamonds, tips—raw format, http://www.colorshots.com/cs101e/html/tipps_raw.html, Feb. 12, 2002, pp. 1–4.

* cited by examiner

*Primary Examiner*—Wendy R. Garber
*Assistant Examiner*—Luong T Nguyen
(74) *Attorney, Agent, or Firm*—Michael Shenker; MacPherson Kwok Chen & Heid LLP (57) ABSTRACT

In some embodiments of the invention, when a color component (e.g. red, green or blue) is reconstructed at a pixel from the intensity values for this component at adjacent pixels, the intensities at the adjacent pixels are assigned weights. Greater weights are assigned to those pixels for which a gradient is smaller. The gradient for each adjacent pixel is indicative of a magnitude of a change of another color component in the direction of the adjacent pixel and/or a magnitude of the rate of change of the other color component in the direction of the adjacent pixel. In some embodiments, the weights are chosen to reduce the impact of noise. In some embodiments, the reconstructed value of a color component is adjusted to incorporate information on color spikes that is carried by another color component.

21 Claims, 6 Drawing Sheets

FIG. 1

| R | G | R | G | R | G | R | G |
|---|---|---|---|---|---|---|---|
| G | B | G | B | G | B | G | B |
| R | G | R | G | R | G | R | G |
| G | B | G | B | G | B | G | B |
| R | G | R | G | R | G | R | G |
| G | B | G | B | 120.2 G | B | G | B |
| R | G | R | 120.5 G | 120.1 R | 120.3 G | R | G |
| G | B | G | B | 120.4 G | B | G | B |

| $R_{100}$ | $G_{100}$ | $R_{100}$ | $G_{100}$ | $R_{100}$ | $G_{100}$ | $R_{100}$ | $G_{100}$ | $R_{10}$ |
|---|---|---|---|---|---|---|---|---|
| $G_{100}$ | $B_0$ | $G_{100}$ | $B_0$ | $G_{100}$ | $B_0$ | $G_{100}$ | $B_0$ | $G_{10}$ |
| $R_{100}$ | $G_{100}$ | $R_{100}$ | $G_{100}$ | 120.8 $R_{100}$ | $G_{100}$ | $R_{10}$ | $G_{10}$ | $R_{10}$ |
| $G_{100}$ | $B_0$ | $G_{100}$ | $B_0$ | 120.2 $G_{100}$ | $B_0$ | $G_{10}$ | $B_0$ | $G_{10}$ |
| $R_{100}$ | $G_{100}$ | 120.6 $R_{100}$ | 120.5 $G_{100}$ | 120.1 $R_{10}$ | 120.3 $G_{10}$ | 120.7 $R_{10}$ | $G_{10}$ | $R_{10}$ |
| $G_{100}$ | $B_0$ | $G_{100}$ | $B_0$ | 120.4 $G_{10}$ | $B_0$ | $G_{10}$ | $B_0$ | $G_{10}$ |
| $R_{100}$ | $G_{100}$ | $R_{10}$ | $G_{10}$ | 120.9 $R_{10}$ | $G_{10}$ | $R_{10}$ | $G_{10}$ | $R_{10}$ |
| $G_{100}$ | $B_0$ | $G_{10}$ | $B_0$ | $G_{10}$ | $B_0$ | $G_{10}$ | $B_0$ | $G_{10}$ |
| $R_{10}$ | $G_{10}$ | $R_{10}$ | $G_{10}$ | $R_{10}$ | $G_{10}$ | $R_{10}$ | $G_{10}$ | $R_{10}$ |

| R | G | $R_{i-2,j}$ | G | R |
|---|---|---|---|---|
| G | B | $G_{i-1,j}$ | B | G |
| $R_{i,j-2}$ | $G_{i,j-1}$ | $R_{i,j}$ | $G_{i,j+1}$ | $R_{i,j+2}$ |
| G | B | $G_{i+1,j}$ | B | G |
| R | G | $R_{i+2,j}$ | G | R |

FIG. 4

| $R_{i-2,j-2}$ | G | R | G | $R_{i-2,j+2}$ |
|---|---|---|---|---|
| G | $B_{i-1,j-1}$ | G | $B_{i-1,j+1}$ | G |
| R | G | $R_{i,j}$ | G | $R_{i,j+2}$ |
| G | $B_{i+1,j-1}$ | G | $B_{i+1,j+1}$ | G |
| $R_{i+2,j-2}$ | G | $R_{i+2,j}$ | G | $R_{i+2,j+2}$ |

|   |   | $B_{i-2,j}$ |   |   |
|---|---|---|---|---|
| B | G | | G | B |
| G | R | $G_{i-1,j}$ | R | G |
| $B_{i,j-2}$ | $G_{i,j-1}$ | $B_{i,j}$ | $G_{i,j+1}$ | $B_{i,j+2}$ |
| G | R | $G_{i+1,j}$ | R | G |
| B | G | $B_{i+2,j}$ | G | B |

FIG. 7

| $B_{i-2,j-2}$ | G | B | G | $B_{i-2,j+2}$ |
|---|---|---|---|---|
| G | $R_{i-1,j-1}$ | G | $R_{i-1,j+1}$ | G |
| B | G | $B_{i,j}$ | G | $B_{i,j+2}$ |
| G | $R_{i+1,j-1}$ | G | $R_{i+1,j+1}$ | G |
| $B_{i+2,j-2}$ | G | $B_{i+2,j}$ | G | $B_{i+2,j+2}$ |

|   |   |   |   |   |
|---|---|---|---|---|
| G | R | $G_{i-2,j}$ | R | G |
| B | G | $B_{i-1,j}$ | G | B |
| $G_{i,j-2}$ | $R_{i,j-1}$ | $G_{i,j}$ | $R_{i,j+1}$ | $G_{i,j+2}$ |
| B | G | $B_{i+1,j}$ | G | B |
| G | R | $G_{i+2,j}$ | R | G |

RECONSTRUCTION OF COLOR COMPONENTS IN DIGITAL IMAGE PROCESSING

BACKGROUND OF THE INVENTION

The present invention relates to digital image processing, and more particularly to color reconstruction. Some embodiments can be used to process images obtained by digital photographic or video cameras.

Figure 1:
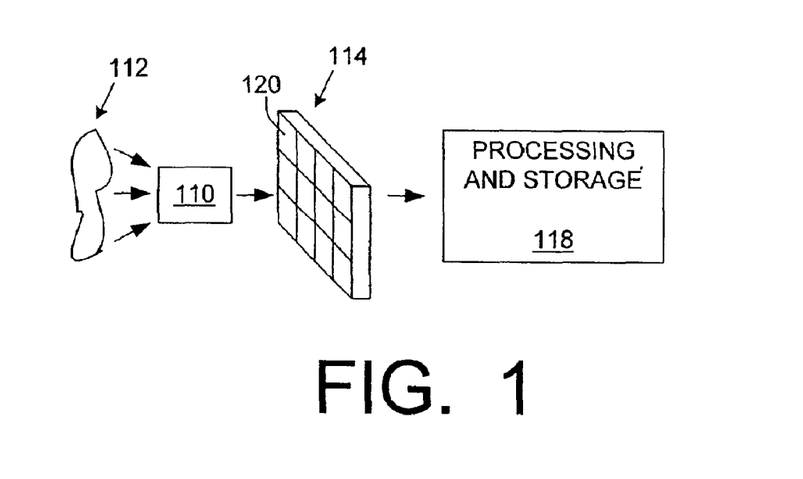
FIG. 1 is a block diagram of a digital camera. This diagram represents prior art cameras and also some embodiments of the present invention.

FIG. 1 illustrates a digital camera. (FIG. 1 is not labeled "prior art" because it will also be used to illustrate some features of the present invention.) Optical system 110 causes an image of a scene 112 to appear on an electronic image-capturing device 114. Device 114 may be a charge coupled device (CCD), a CMOS (Complementary Metal Oxide Semiconductor) based device, or some other type. Device 114 contains an array of light sensors 120 (e.g. photodiodes). Each sensor generates an analog electrical signal indicative of the number of photons registered by the sensor.

The analog signals are converted to digital signals by an A/D converter (not shown). The digital signals are processed by a circuit 118 as desired. Circuit 118 may also perform storage of the digital information which is carried by these signals or derived from these signals.

An image can be described as a collection of picture elements (pixels). Each pixel corresponds to a sensor 120. Therefore, the word "pixel" will be used herein to denote both an image element and a sensor.

Figure 2:
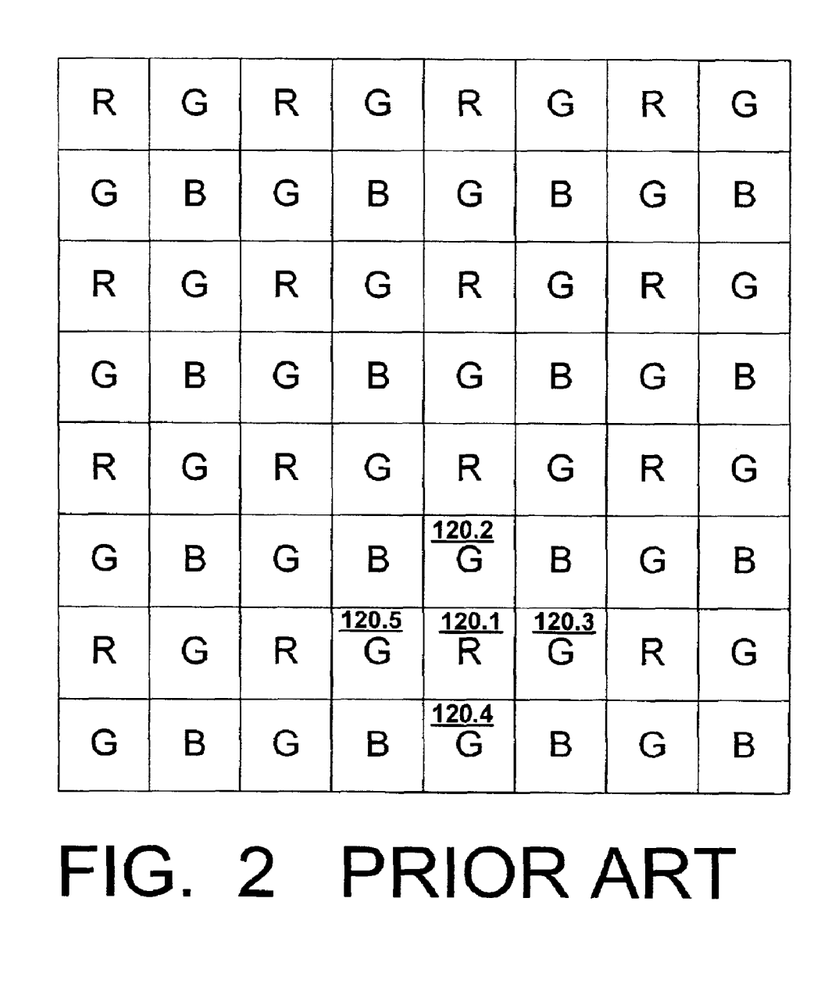
FIG. 2 illustrates a prior art color filter array.

Some digital image processing devices are designed to work with colors represented as a combination of individual color components, e.g. red, green and blue. In order to obtain individual color components, each sensor 120 is covered with a color filter to detect a single component, as illustrated in FIG. 2. The sensors are arranged in a "color filter array", or CFA. Each sensor detects only the red (R), blue (B) or green (G) component. The particular pattern of the red, blue and green filters in FIG. 2 is known as the Bayer or GRGB pattern and described in U.S. Pat. No. 3,971,065 issued Jul. 20, 1976 to Bayer. The Bayer pattern is obtained by repeating the block

| G | R |
|---|---|
| B | G |

The green filters are positioned along every other diagonal. The remaining diagonals contain alternating red and blue filters. The human eye is more sensitive to the green component than to the red and blue components, which is one reason why the green filters occur twice as often as the red and blue filters. Other filter arrays are also known. For example, CYGM (Cyan, Yellow, Green, Magenta) has been used in some photographic cameras.

At each pixel, the color components not measured by the sensor are reconstructed by circuit 118. A component can be reconstructed linearly by taking the component's average at adjacent pixels. For example, the green value at pixel 120.1 can be obtained as the average of the green values at pixels 120.2, 120.3, 120.4, 120.5. Alternatively, the reconstruction can be performed using higher order polynomials (e.g. cubic polynomials). See U.S. Pat. No. 6,320,593 issued Nov. 20, 2001 to Sobel et al.

Figure 3:
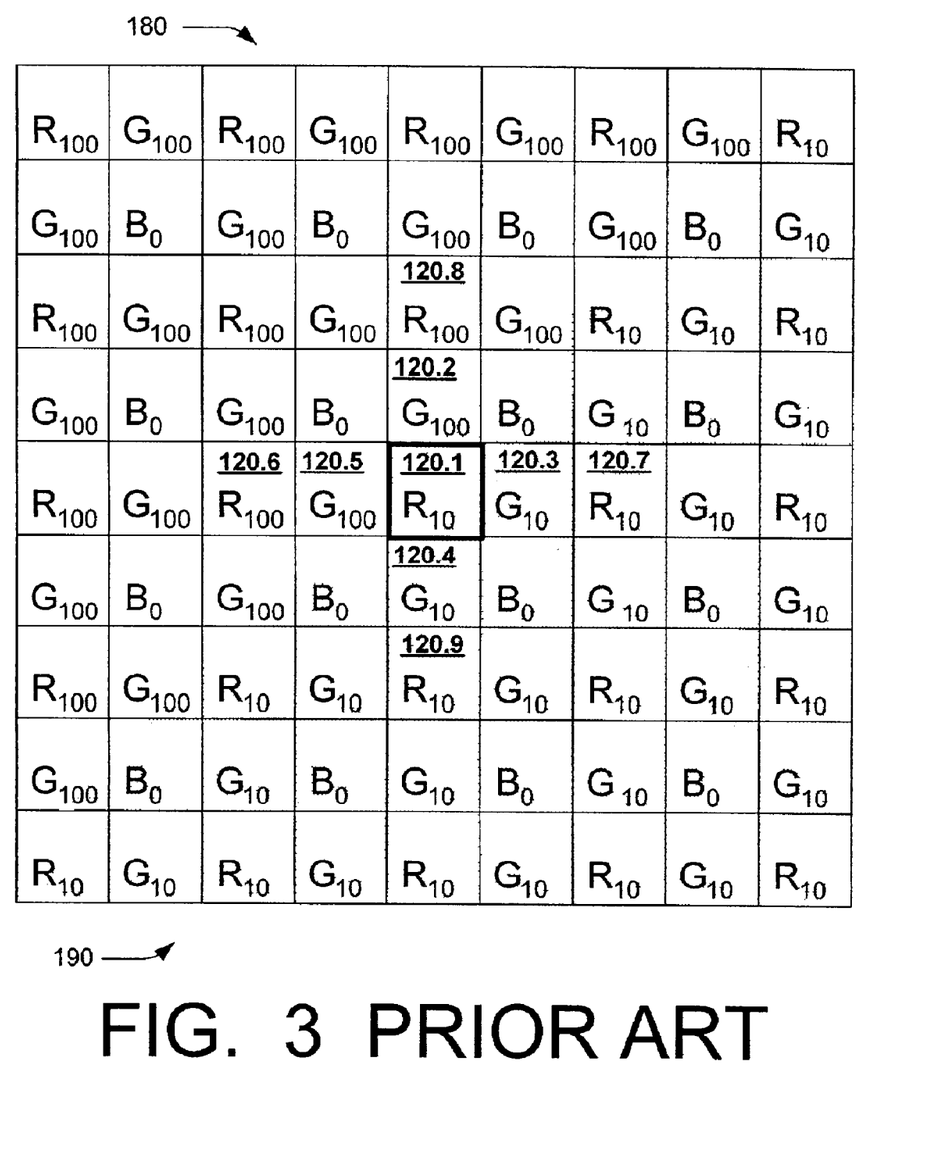
FIG. 3 illustrates a prior art color filter array and a prior art color reconstruction technique.

If a component changes smoothly from pixel to pixel, the linear and higher order polynomial reconstruction techniques yield good results. However, in regions of abrupt color transition the polynomial reconstruction is not adequate. This is illustrated in FIG. 3 showing an image projected on a Bayer color filter array. For each pixel, the corresponding intensity is shown in a subscript. For example, $R_{100}$ indicates a Red pixel (a pixel sensing the red component); the red light intensity sensed at this pixel is 100. Higher numbers indicate higher intensities. The image has yellow areas 180, 190. Yellow is obtained as a combination of red and green. The blue intensity B=0 throughout. In area 180, R=G=100. In area 190, R=G=10, so the area 180 is brighter. If circuit 118 uses bilinear reconstruction, the green intensity at pixel 120.1 will be constructed as the average of the green intensities at pixels 120.2, 120.3, 120.4, 120.5, so the green intensity at pixel 120.1 will be:

$$(100+100+10+10)/4=55 \qquad (1)$$

This intensity value is higher than the red intensity, so the reconstructed image will be green at pixel 120.1.

U.S. Pat. No. 5,373,322 issued Dec. 13, 1994 to Laroche et al. describes the following technique. The horizontal and vertical gradients HDiff and VDiff are computed near the pixel 120.1, where:

$$\text{HDiff}=|(R^{120.7}+R^{120.6})/2-R^{120.1}|$$

$$\text{VDiff}=|(R^{120.8}+R^{120.9})/2-R^{120.1}|$$

If HDiff<VDiff, the image area near pixel 120.1 is presumed to represent predominately horizontal scene structure, so the green intensity at pixel 120.1 is interpolated using the green intensities in the same row:

$$G=(G^{120.5}+G^{120.3})/2$$

If VDiff<HDiff, the image area is presumed to represent predominately vertical scene structure, so the green intensity at pixel 120.1 is interpolated using the green intensities in the same column:

$$G=(G^{120.2}+G^{120.4})/2$$

If however HDiff=VDiff (as in FIG. 3), the green value at pixel 120.1 is interpolated as the average of all the adjacent green intensities, as in equation (1).

SUMMARY

The invention is defined by the appended claims which are incorporated into this section by reference. Some features of the invention are summarized immediately below.

In some embodiments of the invention, when a color component (e.g. red, green or blue) is reconstructed at a pixel from the intensity values for this component at adjacent pixels, the intensities at the adjacent pixels are assigned weights. Greater weights are assigned to those pixels for which a gradient is smaller. The gradient for each adjacent pixel is indicative of a magnitude of a change of another color component in the direction of the adjacent pixel and/or a magnitude of the rate of change of the other color component in the direction of the adjacent pixel.

In some embodiments, the weights are chosen to reduce the impact of noise. In some embodiments, the reconstructed value of a color component is adjusted to incorporate information on color spikes that is carried by another color component.

The invention is applicable to color patterns other than Bayer color filter arrays. Other features of the invention are described below.

DESCRIPTION OF SOME EMBODIMENTS

Figure 4:
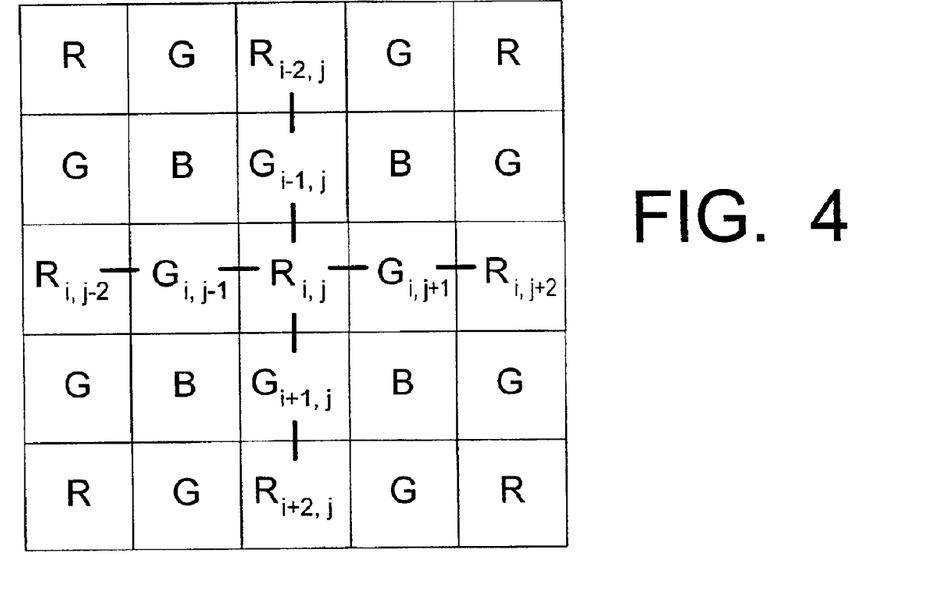
FIGS. 4–8 illustrate prior art color filter arrays in combination with color reconstruction techniques according to some embodiments of the present invention.

Color reconstruction using weights will now be illustrated for one embodiment using a Bayer color filter array. The array is illustrated in FIG. 4. The pixels are indexed for ease of reference by numbers i, j, where i is the row number and j is the column number. $R_{i,j}$ indicates the red intensity at pixel (i, j), $G_{i,j-1}$ indicates the green intensity at pixel (i, j–1), and so on. FIG. 4 illustrates actually measured (not reconstructed) intensities. The color reconstruction can be performed in the camera of FIG. 1 by a novel circuit 118. The invention is not limited to digital cameras. The color reconstruction can be performed by a separate computer or another suitable device, known or to be invented.

The green intensity at the red pixel (i, j) is reconstructed using four gradients $\Delta_L$, $\Delta_R$, $\Delta_A$, $\Delta_B$ corresponding to four respective directions—left ("L"), right ("R"), up (or above, "A"), and down (or below, "B"). These gradients can be any values indicative of the magnitude of the red intensity change at the pixel (i, j) in the corresponding direction, and/or the magnitude of the rate of change of the red intensity in the corresponding direction. For example:

$$\Delta_L = |R_{i,j-2} - R_{i,j}| + \alpha$$

$$\Delta_R = |R_{i,j+2} - R_{i,j}| + \alpha$$

$$\Delta_A = |R_{i-2,j} - R_{i,j}| + \alpha$$

$$\Delta_B = |R_{i+2,j} - R_{i,j}| + \alpha \quad (3.1)$$

where $\alpha$ is a positive number. The a parameter can be used to reduce the impact of noise, as explained below.

For each direction L, R, A, B, a corresponding weight coefficient $k_L$, $k_R$, $k_A$, $k_B$ is obtained so that the weight coefficient is smaller if the corresponding gradient $\Delta$ is larger. For example:

$$k_L = 1/\Delta_L$$

$$k_R = 1/\Delta_R$$

$$k_A = 1/\Delta_A$$

$$k_B = 1/\Delta_B \quad (3.2)$$

The green intensity $G^*_{i,j}$ at pixel (i, j) is reconstructed by weighing the green intensities at the adjacent green pixels with the corresponding weights ("*" indicates that this is a reconstructed value):

$$G^*_{i,j} = (G_{i,j-1} k_L + G_{i,j+1} k_R + G_{i-1,j} k_A + G_{i+1,j} k_B) / \Sigma k_m \quad (3.3)$$

where $$\Sigma k_m = k_L + k_R + k_A + k_B \quad (3.4)$$

In the example of FIG. 3, if a is close to zero, the reconstructed green intensity G* at pixel 120.1 will be close to the optimal value of 10. For example, if $\alpha=1$, then G* is between 10 and 11. Of note, in some embodiments, the values R, G, B, a are integers. The invention is not limited to such embodiments however.

The $\Delta$ and k values can be defined in different ways for different directions in the same embodiment. For example, different $\alpha$ values can be used for different directions.

The term "weight" as used herein can refer values such as $k_L$, or values such as $k_L/\Sigma k_m$. In either case, when equations (3.2), (3.3) are used, the weights assigned to the four directions L, R, A, B are directly proportional to the respective values $1/\Delta_L$, $1/\Delta_R$, $1/\Delta_A$, $1/\Delta_B$.

Figure 5:
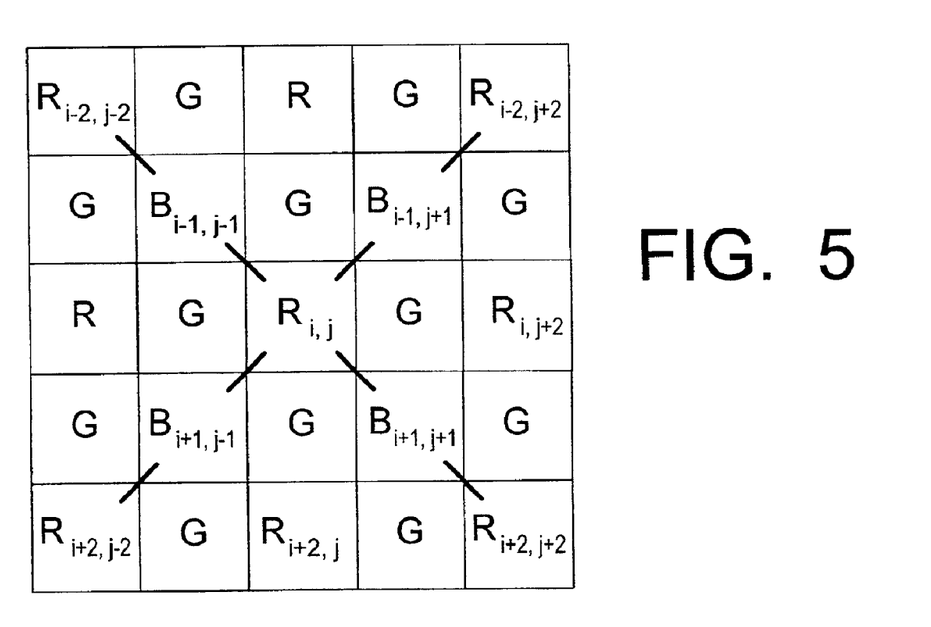

FIG. 5 illustrates reconstruction of the blue intensity $B^*_{i,j}$ at pixel (i, j). The blue intensity is reconstructed from the measured intensities at the four adjacent pixels located along the diagonals—the "left above" pixel (i–1,j–1), the "right above" pixel (i–1,j+1), the "left below" pixel (i+1,j–1), and the "right below" pixel (i+1,j+1). The corresponding directions will be labeled LA (left above), RA (right above), LB (left below), RB (right below). The corresponding gradients can be any values indicative of the magnitude of the red intensity change at the pixel (i, j) in the corresponding direction, and/or the magnitude of the rate of change of the red intensity in the corresponding direction. For example:

$$\Delta_{LA} = |R_{i-2,j-2} - R_{i,j}| + \alpha$$

$$\Delta_{RA} = |R_{i-2,j+2} - R_{i,j}| + \alpha$$

$$\Delta_{LB} = |R_{i+2,j-2} - R_{i,j}| + \alpha$$

$$\Delta_{RB} = |R_{i+2,j+2} - R_{i,j}| + \alpha \quad (4.1)$$

where $\alpha$ is a positive number, which may or may not be the same for different directions. The value of $\alpha$ may or may not be the same as in equations (3.1). The corresponding weight coefficients $k_{LA}$, $k_{RA}$, $k_{LB}$, $k_{RB}$ are chosen so that a smaller weight corresponds to a larger gradient. For example:

$$k_{LA} = 1/\Delta_{LA}$$

$$k_{RA} = 1/\Delta_{RA}$$

$$k_{LB} = 1/\Delta_{LB}$$

$$k_{RB} = 1/\Delta_{RB} \quad (4.2)$$

Then blue intensity $B^*_{i,j}$ is reconstructed as follows:

$$B^*_{i,j} = (B_{i-1,j-1} k_{LA} + B_{i-1,j+1} k_{RA} + B_{i+1,j-1} k_{LB} + B_{i+1,j+1} k_{RB}) / \Sigma k_n \quad (4.3)$$

where $$\Sigma k_n = k_{LA} + k_{RA} + k_{LB} + k_{RB} \quad (4.4)$$

Figure 6:
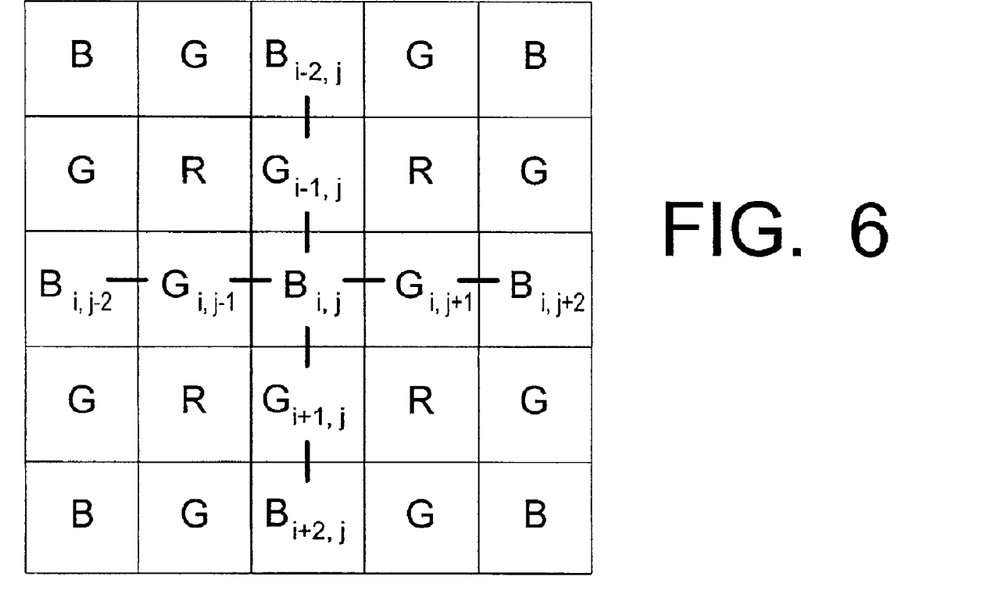
Figure 7:
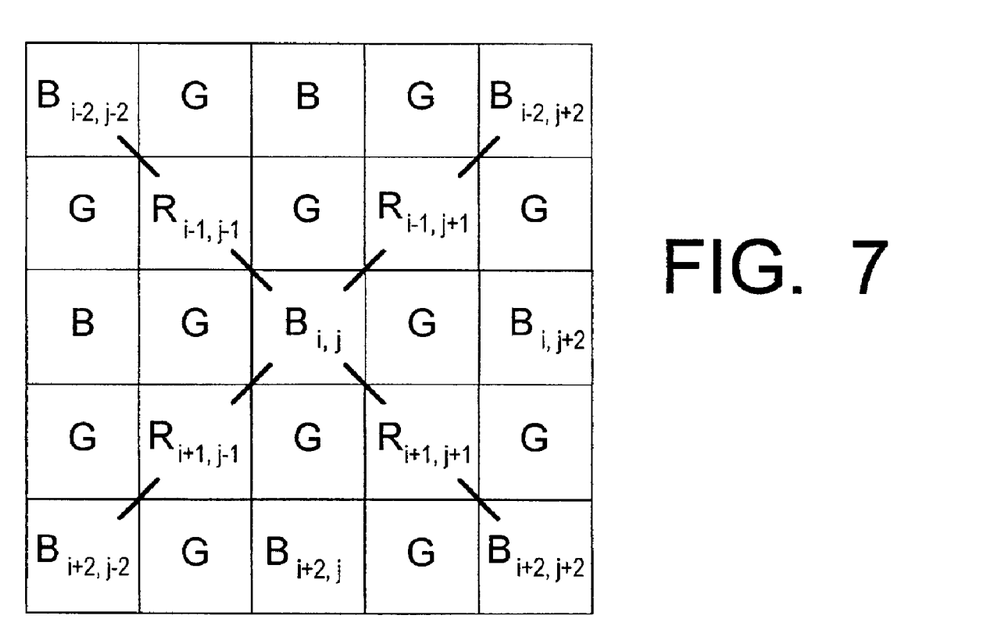

If the (i, j) pixel is blue, the green and red intensities can be reconstructed in a similar manner. This is illustrated in FIGS. 6, 7. FIGS. 6, 7 are similar to the respective FIGS. 4, 5. The red and blue intensities are interchanged. The $\Delta$ values can be defined as in equations (3.1), (4.1), or in some other way, to represent the blue color gradients. The weights can be defined as in equations (3.2), (4.2), or in some other way, so that larger gradients correspond to smaller weights. Then the equation (3.3) is used to determine G*, and the equation similar to equation (4.3) is used to determine R*. For the case when the $\Delta$ and k values are determined as in equations (3.1), (3.2), (4.1), 4.2), the corresponding equations are as follows:

$$\Delta_L = |B_{i,j-2} - B_{i,j}| + \alpha$$

$$\Delta_R = |B_{i,j+2} - B_{i,j}| + \alpha$$

$$\Delta_A = |B_{i-2,j} - B_{i,j}| + \alpha$$

$$\Delta_B = |B_{i+2,j} - B_{i,j}| + \alpha \tag{5.1}$$

$$k_L = 1/\Delta_L$$

$$k_R = 1/\Delta_R$$

$$k_A = 1/\Delta_A$$

$$k_B = 1/\Delta_B \tag{5.2}$$

$$G^*_{i,j} = (G_{i,j-1}k_L + G_{i,j+1}k_R + G_{i-1,j}k_A + G_{i+1,j}k_B)/\Sigma k_m \tag{5.3}$$

$$\Sigma k_m = k_L + k_R + k_A + k_B \tag{5.4}$$

$$\Delta_{LA} = |B_{i-2,j-2} - B_{i,j}| + \alpha$$

$$\Delta_{RA} = |B_{i-2,j+2} - B_{i,j}| + \alpha$$

$$\Delta_{LB} = |B_{i+2,j-2} - B_{i,j}| + \alpha$$

$$\Delta_{RB} = |B_{i+2,j+2} - B_{i,j}| + \alpha \tag{6.1}$$

$$k_{LA} = 1/\Delta_{LA}$$

$$k_{RA} = 1/\Delta_{RA}$$

$$k_{LB} = 1/\Delta_{LB}$$

$$k_{RB} = 1/\Delta_{RB} \tag{6.2}$$

$$R^*_{i,j} = (R_{i-1,j-1}k_{LA} + R_{i-1,j+1}k_{RA} + R_{i+1,j-1}k_{LB} + R_{i+1,j+1}k_{RB})/\Sigma k_n \tag{6.3}$$

$$\Sigma k_n = k_{LA} + k_{RA} + k_{LB} + k_{RB} \tag{6.4}$$

Figure 8:
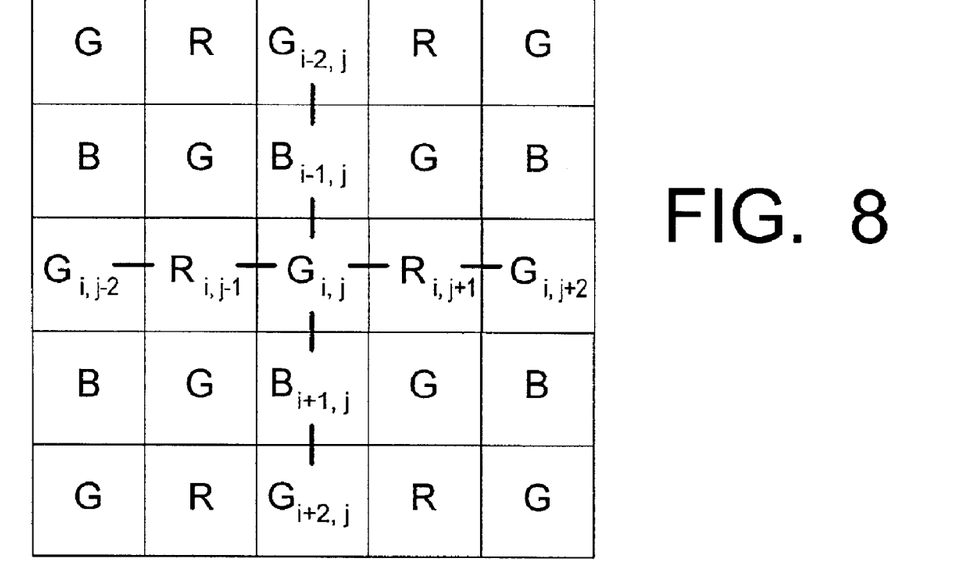

If the (i, j) pixel is green, similar techniques are used. See FIG. 8. Pixel (i, j) has red pixels on the left and the right, and blue pixels above and below. The reconstruction is performed using the left and right directions for the red component and the above and below directions for the blue component. If the blue pixels are adjacent to the green pixel on the left and right and the red pixels are adjacent above and below, the red and blue intensities interchange. For the case of FIG. 8, using the gradients and weights defined as in equations (3.1), (3.2), we obtain:

$$\Delta_L = |G_{i,j-2} - G_{i,j}| + \alpha$$

$$\Delta_R = |G_{i,j+2} - G_{i,j}| + \alpha \tag{7.1}$$

$$k_L = 1/\Delta_L$$

$$k_R = 1/\Delta_R \tag{7.2}$$

$$R^*_{i,j} = (R_{i,j-1}k_L + R_{i,j+1}k_R)/(k_L + k_R) \tag{7.3}$$

$$\Delta_A = |G_{i-2,j} - G_{i,j}| + \alpha$$

$$\Delta_B = |G_{i+2,j} - G_{i,j}| + \alpha \tag{8.1}$$

$$k_A = 1/\Delta_A$$

$$k_B = 1/\Delta_B \tag{8.2}$$

$$B^*_{i,j} = (B_{i-1,j}k_A + B_{i+1,j}k_B)/(k_A + k_B) \tag{8.3}$$

The α parameter can be used to reduce the impact of noise in the measured values. Noise may be caused by imperfections in sensors 120 or other circuitry. In equations (3.1), (4.1), (5.1), (6.1), (7.1), (8.1), the higher the a value, the smaller the contribution of the measured value differences such as $|R_{i,j-2} - R_{i,j}|$, so the noise impact is reduced. In some embodiments, α is made larger when the noise is expected to be higher. Different α parameters can be chosen for the red, green and blue pixels due to possible different noise associated with the measured R, G, and B values, or different eye sensitivity to the noise in these different components. Suitable α value can be chosen experimentally.

In some embodiments, circuit 118 represents the R, G and B values as integers from 0 to $M_{max}$ inclusive. The value 0 corresponds to the zero light intensity, $M_{max}$ to the maximum intensity that can be measured by the camera. If each intensity R, G, and B is represented in 8 bits, then $M_{max}$ = 255. The α values from 1 to 5 inclusive have produced good experimental results for the 8 bit case. If 12 bits are used, $M_{max}$ = 4095 or 3965 in some cameras. The α values from 16 to 80 inclusive have produced good results in this case.

In some photographic camera embodiments, different α values are used for different lighting conditions and different sensitivity settings of a digital camera. The α value can be chosen as:

$$\alpha = M_{max} * \epsilon \tag{9}$$

where ε is a numerical expression of a relative noise level for given lighting and camera sensitivity.

In some embodiments, the α value is obtained during calibration as follows. The sensitivity is set to the desired value, the desired lighting conditions are established, and a picture is taken of a white sheet of paper positioned out of focus, in diffused light coming from a side so as to exclude specular reflection from the paper. For the chosen sensitivity and lighting, the aperture and the shutter speed are adjusted so that:

$$M_{max}/2 < X_{max} < 2/3 M_{max} \tag{10}$$

where $X_{max}$ is the maximum measured color value (the maximum of the red, green and blue measured values) obtained for the picture. Due to noise, the measured R values are not uniform across the color filter array, and neither are the G and B values. Let $R_{mean}$, $G_{mean}$, $B_{mean}$ deonte the mean measured values for the red, green and blue pixels respectively. Let $N_g$ be the total number of the green pixels, $N_r$ the total number of the red pixels, and $N_b$ the total number of the blue pixels. Then:

$$R_{mean} = \sum_{i=1}^{N_r} R_i / N_r \tag{11}$$

$$G_{mean} = \sum_{i=1}^{N_g} G_i / N_g \tag{12}$$

$$B_{mean} = \sum_{i=1}^{N_b} B_i / N_b \tag{13}$$

The α value can be defined as:

$$\alpha = \sqrt{\frac{\sum_{i=1}^{N_r}\{(R_i - R_{mean})^2 + \sum_{i=1}^{N_g}(G_i - G_{mean})^2 + \sum_{i=1}^{N_b}(B_i - B_{mean})^2\}}{N_r + N_g + N_b}} \tag{14}$$

The α value can be rounded to an integer.

Other α values can also be used.

Circuit 118 remembers (stores) the α values and then uses them for the corresponding sensitivity and lighting conditions.

Figure 9:
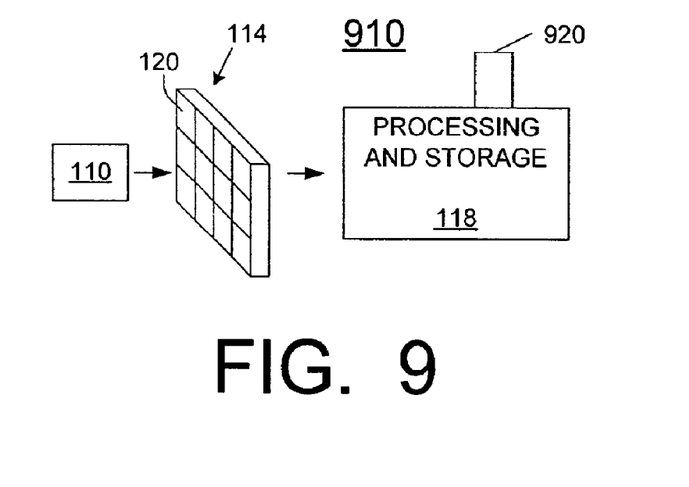
FIG. 9 is a block diagram of a camera according to some embodiments of the present invention.

As shown in FIG. 9, a camera 910 can be provided with a manual control 920 to allow the user to manually adjust the α value.

In some embodiments, the reconstructed values are adjusted to incorporate information on possible color spikes. Color spikes can be caused by specular reflection of light in the scene being photographed, for example, from an eye ball or a spherical surface of a decorative object. The image of a point on an object being photographed is a region on the color filter array. This region may or may not be larger than a pixel. Suppose there is an intensity spike at some point on the object, and the image of this point overlaps some pixel, e.g. the pixel (i, j) in FIG. 4. If the image is much larger than the pixel (i, j), then the spike will likely affect the surrounding pixels, and will be represented in the reconstructed green and blue values $G^*_{i,j}$, $B^*_{i,j}$ (equations 3.3, 4.3). If the image of the point is much smaller than the pixel (i, j), there is a greater possibility that the spike will not be accurately represented in the reconstructed green and blue values.

The color reconstruction can be adjusted to follows. Referring to FIG. 4, let us compute a reconstructed red value using the following equation which is similar to equation (3.3):

$$R^*_{i,j}=(R_{i,j-2}k_L+R_{i,j+2}k_R+R_{i-2,j}k_A+R_{i+1,j}k_B)/\Sigma k_m \quad (15.1)$$

If a color spike occurred at pixel (i, j) that did not affect the surrounding pixels, this fact can be represented by the following value:

$$\Delta R=R_{i,j}-R^*_{i,j} \quad (15.2)$$

The reconstructed G value can be increased by $\Delta R$ or some function of $\Delta R$. In some embodiments, the reconstructed G value is:

$$G^{**}_{i,j}=G^*_{i,j}+q\Delta R \quad (15.3)$$

where $G^*_{i,j}$ is given by equation (3.3) and q is a predefined constant. The constant q may be chosen based on the properties of optical system 110, or may be determined experimentally. In some embodiments, q is between 0 and 1 inclusive. If an image of a point is much larger than a pixel, then q is close to zero. If an image of a point is much smaller than a pixel, q is close to 1. Good results have been obtained for some cameras with q between ½ and ⅔.

Other color reconstruction formulas can be adjusted in a similar manner. For example, instead of equation (4.3), the following blue color reconstruction can be used:

$$B^{**}_{i,j}=B^*_{i,j}+q\Delta R \quad (16)$$

where $B^*_{i,j}$ is defined by equation (4.3). For the case of FIGS. 6, 7, instead of equation (5.3), the following reconstruction can be used:

$$G^{**}_{i,j}=G^*_{i,j}+q\Delta B \quad (17)$$

where:

$G^*_{i,j}$ is defined by equation (5.3);

$$\Delta B=B_{i,j}-B^*_{i,j} \quad (18)$$

$$B^*_{i,j}=(B_{i,j-2}k_L+B_{i,j+2}k_R+B_{i-2,j}k_A+B_{i+1,j}k_B)/\Sigma k_m \quad (19)$$

and $k_L$, $k_R$, $k_A$, $k_B$, $\Sigma k_m$ are defined by equations (5.2), (5.4). Instead of equation (6.3), the following red color reconstruction can be used:

$$R^{**}_{i,j}=R^*_{i,j}+q\Delta B \quad (20)$$

where $R^*_{i,j}$ is defined by equation (6.3).

For the case of FIG. 8, instead of equation (7.3), the following red color reconstruction can be used:

$$R^{**}_{i,j}=R^*_{i,j}+q\Delta G \quad (21)$$

where:

$R^*_{i,j}$ is defined by equation (7.3);

$$\Delta G=G_{i,j}-G^*_{i,j} \quad (22)$$

$$G^*_{i,j}=(G_{i,j-2}k_L+G_{i,j+2}k_R)/(k_L+k_R) \quad (23)$$

and $k_L$ and $k_R$ are defined as in (7.2). Instead of equation (8.3), the following blue color reconstruction can be used:

$$B^{**}_{i,j}=B^*_{i,j}+q\Delta G \quad (24)$$

where:

$B^*_{i,j}$ is defined by equation (8.3);

$$\Delta G=G_{i,j}-G^*_{i,j} \quad (25)$$

$$G^*_{i,j}=(G_{i-2,j}k_A+G_{i+2,j}k_B)/(k_A+k_B) \quad (26)$$

and $k_A$ and $k_B$ are defined by (8.2).

The q values can be different for different kinds of pixels (e.g. the red pixels may have different q values from the green pixels, and so on).

More generally, suppose C1 is a color component being reconstructed at pixel (i, j) using gradients of another color component C2. In the case of equations (15.1)–(15.3), C1=G and C2=R. Let F1 (C1, k) be a function of the values of component C1 and weights k. An exemplary function is given by equation (15.1). Then the reconstructed value for component C1 at pixel (i, j) can be represented as F1(C1,k)+F2(ΔC2)

where ΔC2 is the difference between the value of C2 at pixel (i, j) and F1 (C2, k). F1 (C2, k) is the value of function F1 wherein for each direction, the value of C1 is replaced with the value of C2 for the same direction.

Figure 10:
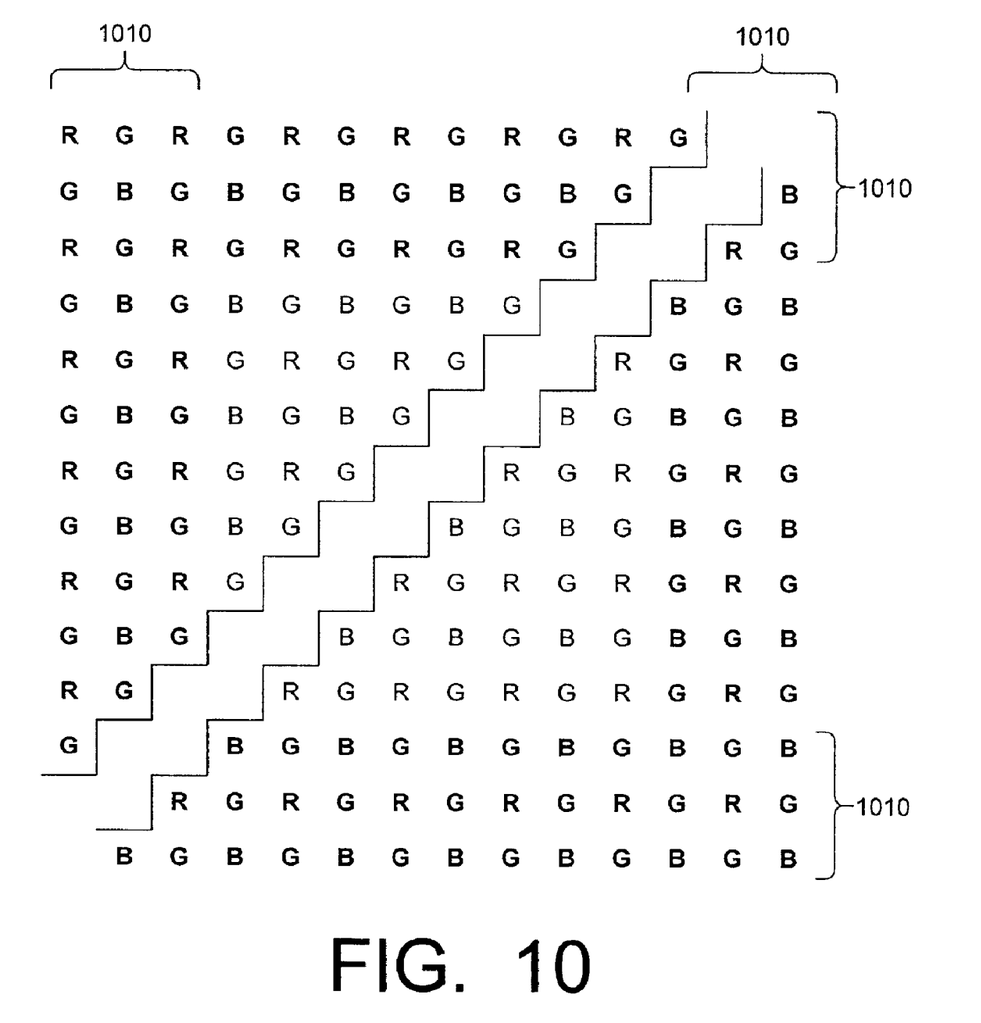
FIG. 10 illustrates a prior art color filter array to which reconstruction techniques can be applied according to some embodiments of the present invention.

The reconstruction techniques described above are suitable for reconstruction of color values at pixels on the image boundary because a typical color filter array contains spare pixels at the boundary. In the example of FIG. 10, the color filter array contains three rows and columns 1010 of spare pixels along the image boundary. Any number of spare rows and columns can be present. Alternatively, if a pixel (i, j) is located at an image boundary, the weight coefficients k for pixels lying outside of the image area can be set to zero. Alternatively, the pixels lying outside of the image area can be assigned some "measured" values, for example, symmetrical values relative to the boundary. These pixels may or may not be present in the color filter array.

The invention is not limited to any mathematical definitions or representations. For example, referring to formulas (3.1) and (3.2), one may define $\Delta_L$ and $k_L$ equivalently as follows:

$$\Delta_L=|R_{i,j-2}-R_{i,j}| \quad (27)$$

$$k_L=1/(\Delta_L+\alpha) \quad (28)$$

The directions L (left), R (right), and so on, can be associated with lines originating from a pixel at which the reconstruction is performed. For example, in FIG. 3, four lines can be defined originating from the pixel (i, j), for example, from the center of the pixel. One line is a horizontal line going to the right, one line is a horizontal line going to the left, one line is a vertical line going up, and one line is a vertical line going down. The value of the green color component is reconstructed at pixel (i, j) from the green values at pixels (i, j−1), (i, j+1), (i−1, j), (i+1, j) which overlap the corresponding lines. The lines are straight, but this is not necessary. Each gradient Δ of the red color component is indicative of a magnitude of a change of the red color component along the corresponding line, and/or a magnitude of the rate of change of the red color component along the corresponding line. A pixel can be any area consisting of one or more points.

Instead of reconstructing the R, G and B components, some embodiments of the invention reconstruct some functions of the R, G, and B components, for example, the G, R-G, and B-G components.

The invention is not limited to the GRGB filter arrays. Other filter arrays, known or to be invented, can also be used. Circuit 118 can be a processor executing computer instructions stored on a computer readable medium, or a hardwired circuit, or any other type of circuit or circuits known or to be invented. Other embodiments and variations are within the scope of the invention, as defined by the appended claims.

What is claimed is:

1. A digital image processing method comprising reconstructing, by circuitry, a value of a first color component of an image in a first area from values of the first color component in two or more second areas, wherein each second area lies in a corresponding direction from the first area, and each direction is associated with a gradient value indicative of a magnitude of a change of a second color component in that direction and/or a magnitude of a rate of change of the second color component in that direction, and the first color component value in the second area is given a greater weight in the reconstructing operation if the corresponding gradient value is smaller, and is given a smaller weight if the corresponding gradient value is greater, with at least two weights being non-zero weights different from each other.

2. The method of claim 1 wherein there are at least four second areas lying in at least four corresponding different directions, and at least four weights are not zero and are different from each other.

3. The method of claim 1 wherein each weight is directly proportional to:

$$1/(D+\alpha)$$

where D is indicative of the magnitude of the change of the second color component in the corresponding direction between the first area and the corresponding second area and/or the magnitude of the rate of change of the second color component in the corresponding direction between the first area and the corresponding second area; and α is a positive value independent of said magnitude.

4. The method of claim 3 wherein $\alpha = M_{max} * \epsilon$, where:

$M_{max}$ is the maximum value for the first and second color components; and

ε is indicative of a relative noise level in a system from which the first and second color components were obtained.

5. The method of claim 1 wherein the reconstructing operation comprises determining by the circuitry an reconstructed value of the first color component according to an equation:

$$\text{reconstructed value} = F1(C1,k) + F2(\Delta C2)$$

where:

C1 represents the values of the first color component in the second areas;

k represents said weights;

F1 (C1, k) is a value of a predetermined function F1 on the values of the first color component in the second areas, wherein each value of the first color component in a second area is taken with its corresponding weight;

F2 is a predetermined increasing function; and

ΔC2 is the difference between:
  (i) a value of the second color component in the first area; and
  (ii) a value F1 (C2, k) of the function F1 on values of the second color components and the weights k, wherein each value of the second color component is a value in an area in one of said directions from the first area, and each value of the second color component is taken with the corresponding weight associated with the direction.

6. The method of claim 5 wherein $F2(\Delta C2) = q * \Delta C2$ where q is a predetermined positive constant.

7. A computer readable medium comprising a plurality of computer instructions for causing a computer processor to perform the method of claim 1.

8. An apparatus comprising digital image processing circuitry for reconstructing a value of a first color component of an image in a first area from values of the first color component in two or more second areas, wherein each second area lies in a corresponding direction from the first area, and each direction is associated with a gradient value indicative of a magnitude of a change of a second color component in that direction and/or a magnitude of a rate of change of the second color component in that direction, wherein in at least one reconstructing operation the circuitry is operable to give a greater weight to a first color component value in a second area if the corresponding gradient value is smaller, and to give a smaller weight if the corresponding gradient value is greater, with at least two weights being non-zero weights different from each other.

9. The apparatus of claim 8 wherein in said one reconstructing operation each weight is directly proportional to:

$$1/(D+\alpha)$$

where D is indicative of the magnitude of the change of the second color component in the corresponding direction between the first area and the corresponding second area and/or the magnitude of the rate of change of the second color component in the corresponding direction between the first area and the corresponding second area; and α is a positive value independent of said magnitude.

10. The apparatus of claim 9 further comprising a user operable control for manually adjusting the value α.

11. The apparatus of claim 8 wherein in said at least one reconstructing operation the circuitry is operable to generate an reconstructed value of the first color component according to an equation:

$$\text{reconstructed value} = F1(C1,k) + F2(\Delta C2)$$

where:

C1 represents the values of the first color component in the second areas;

k represents said weights;

F1(C1, k) is a value of a predetermined function F1 on the values of the first color component in the second areas, wherein each value of the first color component in a second area is taken with its corresponding weight;

F2 is a predetermined increasing function; and

ΔC2 is the difference between:
(i) a value of the second color component in the first area; and
(ii) a value F1 (C2, k) of the function F1 on values of the second color components and the weights k, wherein each value of the second color component is a value in an area in one of said directions from the first area, and each value of the second color component is taken with the corresponding weight associated with the direction.

12. The apparatus of claim 11 wherein F2(ΔC2)=q*ΔC2 where q is a predetermined positive constant.

13. A digital image processing method comprising reconstructing, by circuitry, a value of a first color component of an image in a first area from values of the first color component in two or more second areas, wherein each second area overlaps a corresponding line originating from the first area, and each line is associated with a gradient value indicative of a magnitude of a change of a second color component along the line and/or a magnitude of a rate of change of the second color component along the corresponding line, and the first color component value in the second area is given a greater weight in the reconstructing operation if the corresponding gradient value is smaller, and is given a smaller weight if the corresponding gradient value is greater, with at least two weights being non-zero weights different from each other.

14. The method of claim 13 wherein each said line is a straight line.

15. The method of claim 14 wherein each weight is directly proportional to:

$$1/(D+\alpha)$$

where D is indicative of the magnitude of the change of the second color component along the corresponding line between the first area and the corresponding second area and/or the magnitude of the rate of change of the second color component along the corresponding line between the first area and the corresponding second area; and α is a positive value independent of said magnitude.

16. The method of claim 15 wherein $\alpha=M_{max}^{*}\,\epsilon$, where:

$M_{max}$ is the maximum value for the first and second color components; and

ε is indicative of a relative noise level in a system from which the first and second color components were obtained.

17. The method of claim 14 wherein the reconstructing operation comprises determining by the circuitry an reconstructed value of the first color component according to an equation:

$$\text{reconstructed value}=F1(C1,k)+F2(\Delta C2)$$

where:

C1 represents the values of the first color component in the second areas;

k represents said weights;

F1 (C1, k) is a value of a predetermined function F1 on the values of the first color component in the second areas, wherein each value of the first color component in a second area is taken with its corresponding weight;

F2 is a predetermined increasing function; and

ΔC2 is the difference between:
(i) a value of the second color component in the first area; and
(ii) a value F1 (C2, k) of the function F1 on values of the second color components and the weights k, wherein each value of the second color component is a value on one of said lines, and each value of the second color component is taken with the corresponding weight associated with the line.

18. The method of claim 17 wherein F2(ΔC2)=q*ΔC2 where q is a predetermined positive constant.

19. A computer readable medium comprising a plurality of computer instructions for causing a computer processor to perform the method of claim 13.

20. A circuit for performing the method of claim 13.

21. An apparatus comprising:

a circuit for performing the method of claim 15; and a user operable control for manually adjusting the value α used by the circuit.

* * * * *